Aug. 15, 1967   C. G. NEALE ET AL   3,336,071
SEATING ARRANGEMENT FOR MOTOR VEHICLE
Filed Aug. 10, 1965   2 Sheets-Sheet 1
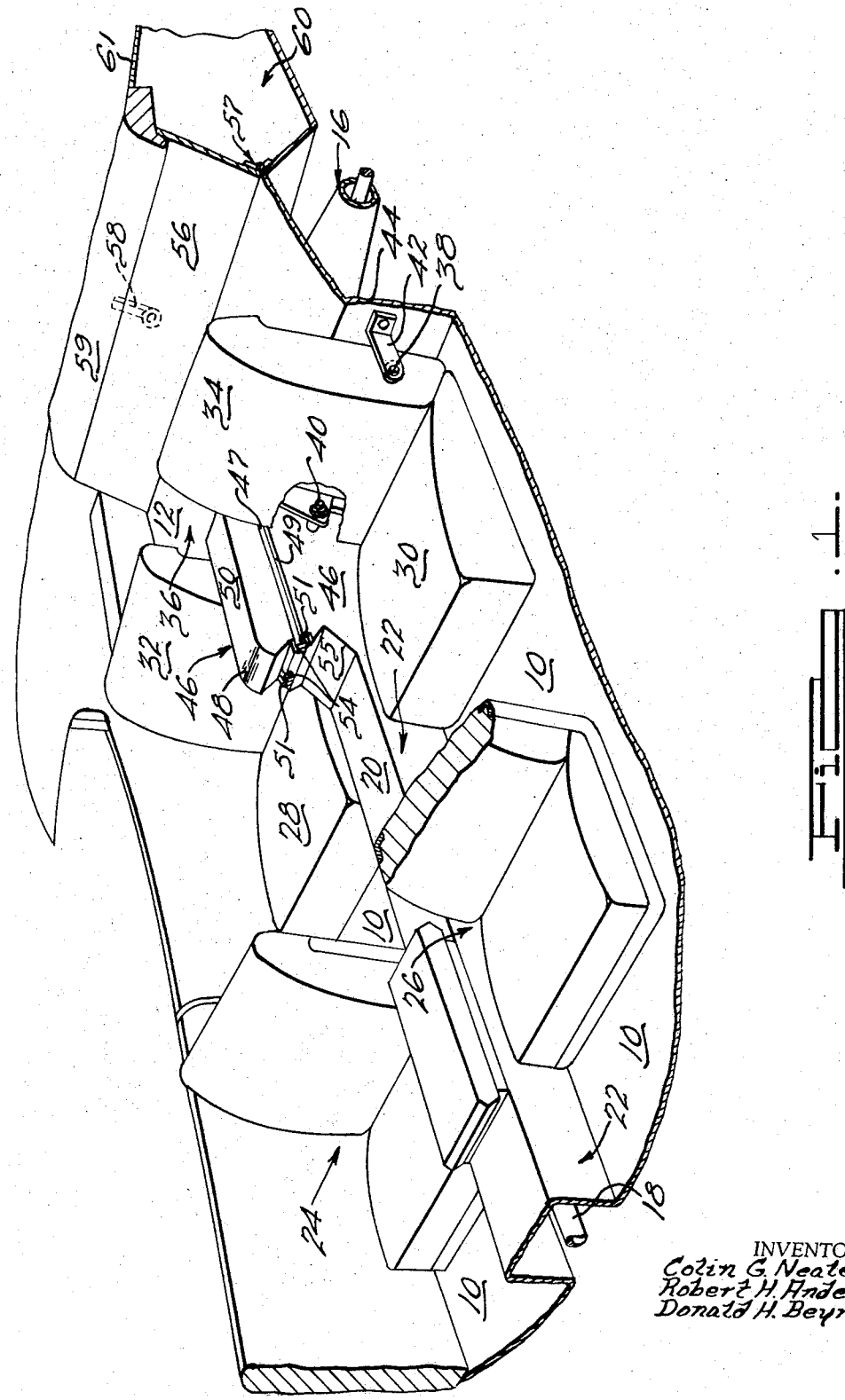
INVENTORS
Colin G. Neale
Robert H. Anders
Donald H. Beyreis

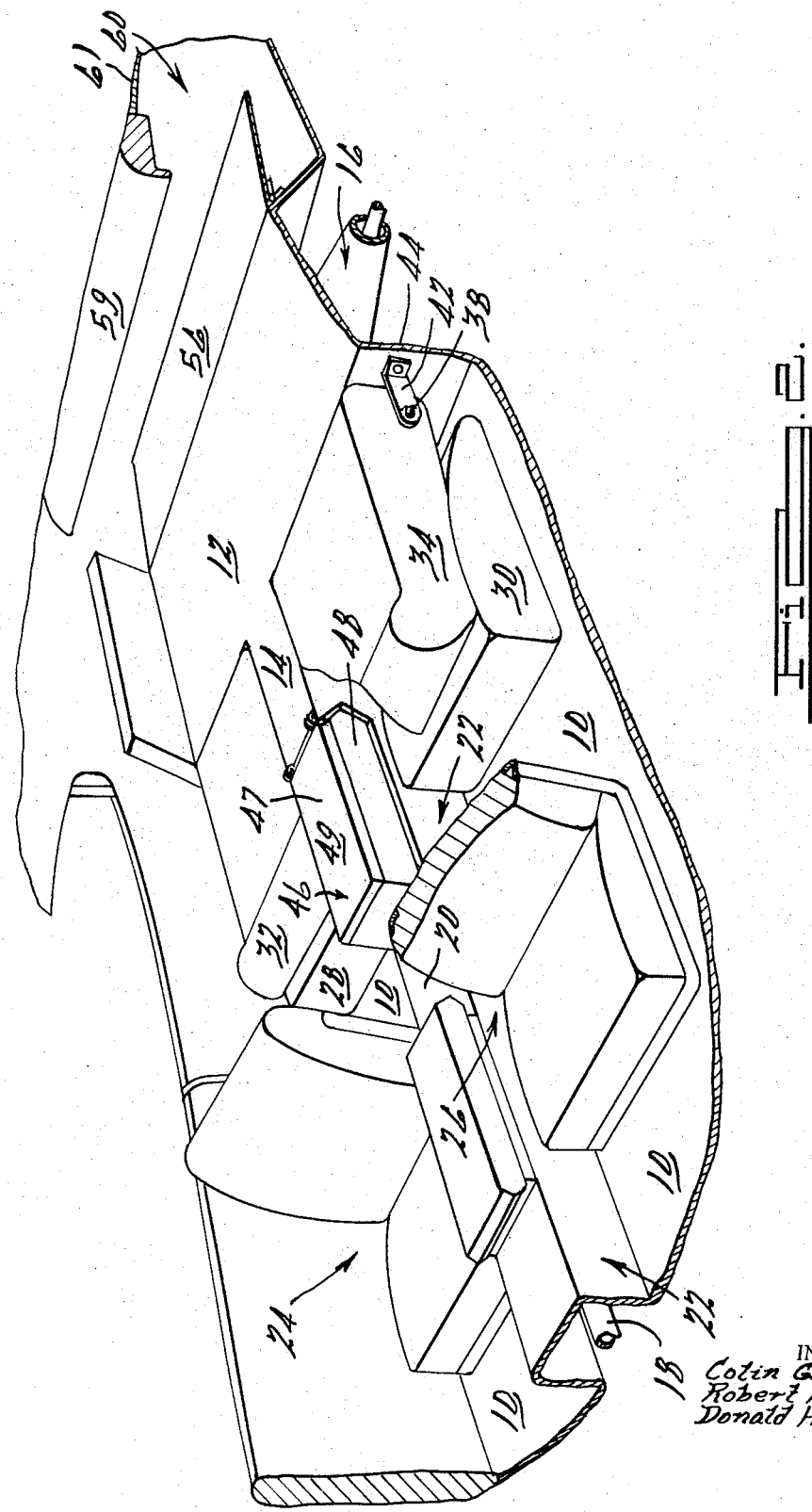

Patented Aug. 15, 1967

3,336,071
SEATING ARRANGEMENT FOR MOTOR
VEHICLE
Colin G. Neale, Dearborn, Robert H. Anders, Birmingham, and Donald H. Beyreis, Orchard Lake, Mich., assignors to Chrysler Corporation, Highland Park, Mich., a corporation of Delaware
Filed Aug. 10, 1965, Ser. No. 478,571
14 Claims. (Cl. 296—64)

This invention relates to a seating arrangement for a motor vehicle. More particularly, it relates to a seating arrangement for a motor vehicle of the multi-purpose type.

It is an object of the present invention to provide an improved seating arrangement for a motor vehicle.

A more specific object is to provide an improved seating arrangement for a motor vehicle of the multi-purpose type.

These and other objects of the invention will be apparent from the following detailed description of a preferred embodiment of the invention and from the accompanying drawings in which:

FIGURE 1 is a fragmentary perspective view of a multi-purpose motor vehicle embodying a seating arrangement according to the invention, the seats and other interior appointments being shown in their seating or passenger carrying positions; and FIGURE 2 is a view similar to FIGURE 1 but showing the seats and other interior appointments in their folded or cargo carrying positions.

The body of the motor vehicle of FIGURES 1 and 2 includes a forward floor portion 10, a rearward floor portion 12 and a central floor portion 14 (FIG. 2). Rearward floor portion 12 extends substantially the full width of the vehicle body and is elevated above the level of the forward floor portion 10 to provide clearance for the rear axle assembly 16. Central floor portion 14 is at the level of rearward floor portion 12 and extends forwardly from the latter along the longitudinal centerline of the vehicle. Central floor portion 14 will be seen to overlie the driveshaft 18 of the vehicle and to form with rearward floor portion 12 a flat and continuous cargo floor area of generally T shape, with portion 14 comprising the stem of the T and portion 12 the cross bar.

The vehicle body also includes a central floor portion 20 extending forwardly from floor portion 14 along the longitudinal centerline of the vehicle but at a lower level than portion 14. Floor portion 20 also overlies drive shaft 18 and may in fact be constituted by the top wall of the drive shaft tunnel 22 extending centrally of the vehicle.

Front seat means, comprising a pair of bucket seats 24 and 26, are supported on forward floor portion 10 at opposite sides of the driveshaft tunnel 22.

Rear seat means are provided behind the front seat means. The rear seat means include two seat bottoms 28, 30 supported on forward floor portion 10 behind the front seat means, one on either side of central floor portion 14. The rear seat means also includes two seat backs 32, 34 longitudinally aligned with seat bottoms 28, 30 respectively, and having a seating or passenger carrying position (FIG. 1) in which they extend upwardly above the level of rearward floor portion 12 to define therebetween an opening 36 communicating with rearward floor portion 12 so that access may be had to floor portion 12 between the upstanding seat backs.

Each seat back is mounted for pivotal movement from its upright seating postion of FIG. 1 to a generally horizontal seating position, seen in FIG. 2, in which it extends forwardly to overlie the related seat bottom and is substantially flush with elevated rearward floor portion 12 and central floor portion 14 to form therewith a generally flat and substantially continuous cargo area. The pivotal mounting of seat back 34 may be accomplished, for example, by pivot pins 38 and 40. Pivot pin 38 is carried on the outboard side of seat back 34 adjacent its lower end and is journalled in a bracket 42 projecting forwardly from step or riser 44 joining floor portions 10 and 12. Pivot pin 40 is carried on the inboard side of seat back 34 and is journalled in the adjacent side wall 46 of drive shaft tunnel 22. The pivotal mounting of seat back 32 is similar to that described for seat back 34. Latch means (not shown) may be provided to secure the seat backs in their seating and/or cargo carrying positions. A latch mechanism suitable for such use is disclosed in copending United States patent application Ser. No. 469,275 filed July 2, 1965, assigned to the assignee of this application.

The motor vehicle of the present invention also includes an arm rest, shown generally as 46.

Arm rest 46 is somewhat elongated and comprises a flat rigid plate member 47 and a cushion member 48 overlying and secured to plate member 47.

Arm rest 46 has a normal position seen in FIGURE 1 lying on and along central floor portion 14 to dispose the underside 49 of plate member 47 in juxtaposition to floor portion 14 and present the upper surface 50 of cushion member 48 for use as an arm rest by rear seat occupants. The distance between arm rest surfaces 49 and 50 (i.e. the thickness of the arm rest) is substantially the same as the vertical distance between the plane of the floor portion 14 and the plane of floor portion 20.

Means are provided to pivotally secure arm rest 46 adjacent its lower forward lateral edge to central floor portion 14 adjacent the forward edge of the latter. This pivotal mounting may be accomplished, for example, by lugs 51 projecting downwardly from the forward edge of plate member 47 and pivotally secured by suitable pins to lugs 54 projecting upwardly from the forward edge of floor portion 14. The arm rest is thus mounted for pivotal movement through approximately 180° from its described normal position of FIGURE 1 to a cargo carrying position, as seen in FIGURE 2, in which it extends forwardly from its pivotally secured edge to overlie central floor portion 20 with the underside 49 of plate member 47 facing upwardly and substantially flush with floor portion 14 to provide a forward extension of the latter. The vertical face 55 joining the forward edge of floor portion 14 to the rearward edge of floor portion 20 is concave to accommodate the convex forward end of cushoin 48 with the arm rest in its cargo carrying position.

The cargo area may be even further increased by lowering a security panel 56 pivotally mounted as by hinge assembly 57, to the rear edge of elevated floor portion 12. In its raised position of FIGURE 1, panel 56 is latched, as by a bolt 58 carried on the rear face of the panel, to a transverse beam member 59. The raised security panel thus blocks access to the trunk 60 of the vehicle through the passenger compartment. In its lowered position of FIGURE 2, panel 56 overlies the trunk floor to extend the cargo area to include the trunk and to allow access to the entire cargo area from the rear of the vehicle by raising of trunk lid 61 pivoted to beam 59.

The described seating arrangement provides individual bucket seat comfort for two rear seat occupants, including comfortable support for the inboard arms of the occupants, and yet may be readily and easily converted to provide, a large, continuous, flat cargo area capable of accommodating even large and unwieldy loads.

The described arrangement also enables selective conversion of the rear seating facilities to match the relative seating and cargo carrying needs of a particular occasion. Thus, if it is desired to carry cargo and yet maintain the ability to carry a single rear seat passenger, one of the seat backs may be folded down and the other seat back, as well as the arm rest, may be left in its seating position.

If further cargo area is desired while yet not eliminating the ability to carry a single rear seat passenger, the arm rest may be moved to its cargo carrying position; and if yet more cargo area is needed, the other seat back may be folded down. The available cargo area may also be selectively increased or decreased by lowering or raising of the security panel.

Although a preferred embodiment of the invention has been illustrated and described in detail, it will be understood that various changes may be made in the embodiment shown without departing from the scope or spirit of the invention. For example, although the geometry of the described arrangement is such that the rear edges of the folded seat backs are immediately adjacent the front edge of rearward cargo floor 12, the invention contemplates that the seat back might be pivoted to leave a gap between the folded seat backs and cargo area 12 and that filler panels of known form might be provided to move into and fill these gaps. Further, although the rear seat bottoms are shown as stationary, the invention contemplates that the rear seat bottoms might be mounted for overturning pivotal movement to form the forward portion of the cargo floor or that they might be mounted to shift forwardly in response to downward pivotal movement of the seat backs to reduce the required seat cushion compression and/or provide for a lower cargo floor profile.

We claim:
1. A motor vehicle including
(A) a vehicle body having
   (1) a first generally T-shaped and generally flat floor portion,
   (2) a second floor portion at one side of the stem section of, and depressed below the level of, said first floor portion, and
   (3) a third floor portion at the other side of the stem section of, and depressed below the level of, said first floor portion; and
(B) seat means including
   (1) a seat bottom supported on said second floor portion,
   (2) a seat bottom supported on said third floor portion, and
   (3) a seat back in general alignment with each said seat bottoms and each mounted for separate pivotal movement, about a horizontal axis generally normal to said stem section, between
      (a) a generally upright seating position in which it extends upwardly above said first floor portion and
      (b) a generally horizontal cargo carrying position in which it extends horizontally and is substantially flush with said first floor portion to form therewith a generally flat and substantially continuous floor area.

2. A motor vehicle including
(A) a vehicle body having
   (1) a first generally T-shaped and generally flat floor portion,
   (2) a second floor portion at one side of the stem section of, and depressed below the level of, said first floor portion, and
   (3) a third floor portion at the other side of the stem section of, and depressed below the level of, said first floor portion; and
(B) seat means including
   (1) a seat bottom supported on said second floor portion;
   (2) a seat bottom supported on said third floor portion, and
   (3) a seat back in general alignment with each said seat bottoms and each mounted for separate pivotal movement, about a horizontal axis generally normal to said stem section, between
      (a) a generally upright seating position in which it extends upwardly above said first floor portion and
      (b) a generally horizontal cargo carrying position in which it extends horizontally and is substantially flush with said first floor portion to form therewith a generally flat and substantially continuous floor area;
(C) a separate arm rest member having a normal position overlying said stem section to dispose its underside in juxtaposition to said stem section and present its upper side for use as an arm rest by occupants of said seat means; and
(D) means pivotally securing said arm rest member adjacent its forward lower lateral edge to said stem section adjacent the free end lateral edge of the latter to mount said arm rest for pivotal movement from its said normal position through approximately 180° to a cargo carrying position in which it extends forwardly from its said lateral edge and its underside faces upwardly and is substantially flush with said stem section to form a forward extension thereof.

3. A motor vehicle comprising
(A) a vehicle body having
   (1) a forward floor portion,
   (2) a rearward floor portion extending substantially the full width of said body and elevated above the level of said forward floor portion to provide clearance for the rear axle assembly of the vehicle and
   (3) a relatively narrow and generally flat central floor portion at the level of said elevated rearward floor portion and extending forwardly therefrom substantially along the longitudinal center line of said vehicle;
(B) front seat means supported on said forward floor portion; and
(C) rear seat means, including
   (1) a seat bottom supported on said forward floor portion behind said front seat at each side of said central floor portion, and
   (2) a seat back in longitudinal alignment with each seat bottom and each mounted for separate pivotal movement about a horizontal axis between
      (a) a generally upright seating position in which it extends upwardly above said elevated rear floor portion adjacent thereto and
      (b) a generally horizontal cargo carrying position in which it extends forwardly and is substantially flush with said elevated rearward and central floor portions to form therewith a generally flat and substantially continuous cargo area.

4. A motor vehicle comprising
(A) a vehicle body having
   (1) a forward floor portion,
   (2) a generally flat rearward floor portion extending substantially the full width of said body and elevated above the level of said forward floor portion to provide clearance for the rear axle assembly of the vehicle, and
   (3) a relatively narrow and generally flat central floor portion at the level of said elevated rearward floor portion and extending forwardly therefrom substantially along the longitudinal centerline of said vehicle to terminate in a forward lateral edge;
(B) front seat means supported on said forward floor portion;
(C) rear seat means including
   (1) a seat bottom supported on said forward floor portion behind said front seat means at each side of said central floor portion and (2) a seat back in longitudinal alignment with each seat bottom and each mounted for separate pivotal movement about a horizontal axis between
    (a) a generally upright seating position in which it extends upwardly above said elevated floor portion adjacent thereto and
    (b) a generally horizontal cargo carrying position in which it extends forwardly and is substantially flush with said elevated rearward and central floor portions to form therewith a generally flat and substantially continuous cargo area;
(D) a separate arm rest member having a normal position overlying said central floor portion to dispose its underside in juxtaposition to said central floor portion and present its upper side for use as an arm rest by occupants of said rear seat means; and
(E) means pivotally securing said arm rest member adjacent its forward lower lateral edge to said central floor portion adjacent the said forward lateral edge of the latter to mount said arm rest member for pivotal movement from its said normal position through approximately 180° to a cargo carrying position in which it extends forwardly from its said lateral edge and its underside faces upwardly and is substantially flush with said central floor portion to further extend said continuous cargo area.

5. A motor vehicle comprising
(A) a vehicle body having
    (1) a first floor portion and
    (2) a second generally flat floor portion elevated above the level of said first floor portion;
(B) seat means including
    (1) a seat bottom supported on said floor;
    (2) a seat back extending upwardly above said second floor portion adjacent thereto;
(C) an arm rest; and
(D) means mounting said arm rest for movement between
    (1) a seating position in which it presents a generally horizontal support surface extending forwardly along one side of said seat bottom at a level to comfortably accommodate an arm of an occupant of said seat means and
    (2) a cargo carrying position in which it presents a generally flat and generally horizontal support surface at the level of, and forming a forward extension of, said second floor portion.

6. A motor vehicle comprising
(A) a floor;
(B) a seat including
    (1) a seat bottom supported on said floor and
    (2) a seat back extending upwardly from said seat bottom adjacent the rearward edge of the latter;
(C) an arm rest having
    (1) a first relatively yieldable surface and
    (2) a second relatively rigid surface; and
(D) means mounting said arm rest for movement between
    (1) a seating position in which said relatively yieldable surface faces upwardly and is disposed at a level to comfortably accommodate an arm of an occupant of said seat and
    (2) a working position in which said relatively rigid surface faces upwardly to provide a hard work surface 7. A motor vehicle comprising
(A) a floor;
(B) a seat including
    (1) a seat bottom supported on said floor and
    (2) a seat back extending upwardly from said seat bottom adjacent the rearward edge of the latter;
(C) means defining a generally flat support surface elevated above the level of said floor and extending forwardly along one side of said seat bottom to terminate in a forward edge;
(D) a separate arm rest member having a normal position overlying said support surface to dispose its underside in juxtaposition to said support surface and present its upper side for use as an arm rest by an occupant of said seat; and
(E) means pivotally securing said arm rest member adjacent its forward lower lateral edge to said support surface adjacent the said forward edge of the latter to mount said arm rest member for pivotal movement from its said normal position through approximately 180° to an extended position in which it extends forwardly from its said lateral edge and its underside faces upwardly and is substantially flush with said support surface to form a forward extension thereof.

8. A motor vehicle comprising
(A) a floor
(B) a seat including
    (1) a seat bottom supported on said floor and
    (2) a seat back extending upwardly from seat bottom adjacent the rearward edge of the latter;
(C) means defining a first generally flat support surface elevated above the level of said floor and extending forwardly along one side of said seat bottom to terminate in a forward edge;
(D) means defining a second support surface extending forwardly from said first surface but at a level a given distance below that of said first surface;
(E) an arm rest having a flat underside and a generally parallel upper side spaced from said underside by said given distance and having a normal position overlying said first support surface to dispose said underside in juxtaposition to said first support surface and present its upper side for use as an arm rest by an occupant of said seat; and
(F) means pivotally securing said arm rest member adjacent its lower forward lateral edge to said first support surface adjacent its said forward edge to mount said arm rest member for pivotal movement from its said normal position through approximately 180° to an extended position in which it extends forwardly from its said lateral edge to overlie said second support surface so that said underside faces upwardly and is substantially flush with said first support surface to form a forward extension thereof.

9. A motor vehicle comprising
(A) a vehicle body having
    (1) a first generally flat T-shaped floor portion;
    (2) a second floor portion at one side of the stem section of, and depressed below the level of, said first floor portion; and
    (3) a third floor portion at the other side of the stem section of, and depressed below the level of, said first floor portion; and
(B) seat means including
    (1) two seat bottoms, one supported on each of said second and third floor portions, and
    (2) two seat backs aligned with the respective seat bottoms and extending upwardly at either side of said stem section above the level of said first floor portion to define therebetween an opening communicating with, and allowing access between said seat backs to, the cross bar section of said first floor portion.

10. A motor vehicle comprising
(A) a vehicle body including
    (1) a forward floor portion,
    (2) a rearward floor portion extending substantially the full width of said body and elevated above the level of said forward floor portion to provide clearance for the rear axle assembly of the vehicle, and (3) a relatively narrow and generally flat central floor portion at the level of said rearward floor portion and adjoining and extending forwardly from said rearward floor portion substantially along the longitudinal center line of said vehicle; and (B) seat means including
(1) two seat bottoms supported on said forward floor portion, one at either side of said elevated central floor portion and
(2) two seat backs longitudinally aligned with the respective seat bottoms and extending upwardly above the level of said rearward floor portion to define therebetween an opening communicating with, and allowing access between said seat backs to, said rearward floor portion.

11. A motor vehicle comprising
(A) a vehicle body including
(1) a forward floor portion,
(2) a rearward floor portion extending substantially the full width of said body and elevated above the level of said forward floor portion to provide clearance for the rear axle assembly of the vehicle, and
(3) a relatively narrow and generally flat central floor portion at the level of said rearward floor portion and adjoining and extending forwardly from said rearward floor portion substantially along the longitudinal center line of said vehicle;
(B) front seat means supported on said forward floor portion; and
(C) rear seat means including
(1) two seat bottoms supported on said forward floor portion behind said front seat means, one on either side of said elevated central floor portion; and
(2) two seat backs longitudinally aligned with the respective seat bottoms and extending upwardly above the level of said rearward floor portion to define therebetween an opening communicating with, and allowing access between said seat backs to, said rearward floor portion.

12. A motor vehicle comprising
(A) a rear axle structure extending transversely of said vehicle;
(B) a drive shaft extending longitudinally and centrally of said vehicle for driving connection to said rear axle structure;
(C) a vehicle body including
(1) a forward floor portion,
(2) a generally flat rearward floor portion extending substantially the full width of said body and elevated above the level of said forward floor portion to overlie and clear said rear axle structure, and
(3) a relatively narrow and generally flat central floor portion at the level of said rearward floor portion and extending forwardly therefrom along the longitudinal centerline of said vehicle to overlie said drive shaft;
(D) front seat means supported on said forward floor portion; and
(E) rear seat means including
(1) two seat bottoms supported on said forward floor portion behind said front seat means one at each side of said central floor portion and
(2) two seat backs extending upwardly from the rearward edge of the respective seat bottoms adjacent said rearward floor portion and defining therebetween an opening communicating with, and allowing access between said seat back to, said rearward floor portion.

13. A motor vehicle comprising
(A) a vehicle body including
(1) a forward floor portion
(2) a rearward floor portion extending substantially the full width of said body and elevated above the level of said forward floor portion to provide clearance for the rear axle assembly of the vehicle,
(3) a first relatively narrow and generally flat central floor portion at the level of said elevated rearward portion and extending forwardly therefrom along the longitudinal center line of the vehicle to terminate in a forward edge, and
(4) a second relatively narrow and generally flat central floor portion extending forwardly from said first central floor portion but at a level a given distance below that of said first portion;
(B) front seat means supported on said forward floor portion;
(C) rear seat means including
(1) two seat bottoms supported on said forward floor portion behind said front seat means, one on either side of said first central floor portion;
(2) two seat backs longitudinally aligned with the respective seat bottoms and extending upwardly above the level of said rearward floor portion to define therebetween an opening communicating with, and allowing access between said seat backs to, said rearward floor portion;
(D) an arm rest having a flat underside and a generally parallel upper side spaced from said underside by said given distance and having a normal position overlying said first central floor portion to dispose its underside in juxtaposition to said first central floor portion and present its upper side for use as an arm rest by occupants of said rear seat means; and
(E) means pivotally securing said arm rest member adjacent its lower forward lateral edge to said first central floor portion adjacent its said forward edge to mount said arm rest member for pivotal movement from its said normal position through approximately 180° to an extended position in which it extends forwardly from its said lateral edge to overlie said second central floor portion so that said underside faces upwardly and is substantially flush with said first central floor portion to form a forward extension thereof.

14. A motor vehicle comprising
(A) a vehicle body including
(1) a forward floor portion;
(2) a rearward floor portion extending substantially the full width of said body and elevated above the level of said forward floor portion to provide clearance for the rear axle assembly of the vehicle,
(3) a first relatively narrow and generally flat central floor portion at the level of said elevated rearward portion and extending forwardly therefrom along the longitudinal center line of the vehicle to terminate in a forward edge, and
(4) a second relatively narrow and generally flat central floor portion extending forwardly from said first central floor portion but at a level a given distance below that of said first portion;
(B) front seat means supported on said forward floor portion;
(C) rear seat means including
(1) a seat bottom supported on said forward floor portion behind said front seat means at each side of said first central floor position;
(2) a seat back in longitudinal alignment with each seat bottom and each mounted for separate pivotal movement about a horizontal axis between
(a) a generally upright seating position in which it extends upwardly above said elevated rearward floor portion adjacent thereto and (b) a generally horizontal cargo carrying position in which it extends forwardly and is substantially flush with said elevated rearward and central floor portion to form therewith a generally flat and substantially continuous cargo area;

(D) an arm rest having a flat underside and a generally parallel upper side spaced from said underside by said given distance and having a normal position overlying said first central floor portion to dispose its underside in juxtaposition to said first central floor portion and present its upper side for use as an arm rest by occupants of said rear seat means; and (E) means pivotally securing said arm rest member adjacent its lower forward lateral edge to said first central floor portion adjacent its said forward edge to mount said arm rest member for pivotal movement from its said normal position through approximately 180° to an extended position in which it extends forwardly from its lateral edge to overlie said second central floor portion so that said underside faces upwardly and is substantially flush with said first central floor portion to form a forward extension thereof.

References Cited
UNITED STATES PATENTS

| | | | |
|---|---|---|---|
| 2,148,086 | 2/1939 | Peters | 296—64 |
| 3,011,822 | 12/1961 | May et al. | 296—66 |
| 3,050,333 | 8/1962 | Smith et al. | 296—64 |

BENJAMIN HERSH, *Primary Examiner.*

J. H. BRANNEN, *Assistant Examiner.*